United States Patent
Elliot et al.

(10) Patent No.: US 7,613,278 B2
(45) Date of Patent: Nov. 3, 2009

(54) ALARM SYSTEM ACTIVATION PLATFORM

(76) Inventors: Harvey Alexander Elliot, 1419 Park Dr., Ojai, CA (US) 93023; Bryan Field-Elliot, 1419 Park Dr., Ojai, CA (US) 93023; Daniel J. Elliot, 1419 Park Dr., Ojai, CA (US) 93023

( * ) Notice: Subject to any disclaimer, the term of this patent is extended or adjusted under 35 U.S.C. 154(b) by 477 days.

(21) Appl. No.: 11/517,025

(22) Filed: Sep. 7, 2006

(65) Prior Publication Data

US 2007/0081634 A1  Apr. 12, 2007

Related U.S. Application Data

(63) Continuation-in-part of application No. 10/462,708, filed on Jun. 17, 2003, now Pat. No. 7,245,703, application No. 11/517,025, which is a continuation-in-part of application No. 10/840,280, filed on May 7, 2004, and a continuation-in-part of application No. 10/861,790, filed on Jun. 7, 2004, now Pat. No. 7,440,554, and a continuation-in-part of application No. 11/226,857, filed on Sep. 14, 2005.

(60) Provisional application No. 60/389,960, filed on Jun. 20, 2002, provisional application No. 60/651,662, filed on Feb. 11, 2005.

(51) Int. Cl.
*H04M 11/00* (2006.01)
*G08B 29/00* (2006.01)

(52) U.S. Cl. ............... 379/37; 379/40; 379/45

(58) Field of Classification Search .......... 379/37–49; 340/506, 531
See application file for complete search history.

(56) References Cited

U.S. PATENT DOCUMENTS

| | | | |
|---|---|---|---|
| 5,134,644 A | 7/1992 | Garton et al. | 379/39 |
| 5,365,568 A | 11/1994 | Gilbert | 379/43 |
| 5,796,633 A | 8/1998 | Burgess et al. | 702/187 |
| 5,923,731 A | 7/1999 | McClure | 379/33 |
| 6,075,451 A | 6/2000 | Lebowitz et al. | 340/539.19 |
| 6,272,212 B1 | 8/2001 | Wulforst et al. | 379/199 |
| 6,311,072 B1 | 10/2001 | Barclay et al. | 455/552 |
| 6,381,307 B1 | 4/2002 | Jeffers et al. | 379/142.01 |
| 6,452,490 B1 | 9/2002 | Garland et al. | 340/506 |
| 6,493,435 B1 | 12/2002 | Petricoin | 379/93.05 |
| 6,603,845 B2 | 8/2003 | Jensen et al. | 379/142.01 |
| 6,829,478 B1 | 12/2004 | Layton et al. | 455/428 |
| 2002/0177428 A1* | 11/2002 | Menard et al. | 455/404 |
| 2003/0128115 A1 | 7/2003 | Giacopelli et al. | 340/506 |
| 2006/0176167 A1* | 8/2006 | Dohrmann | 340/506 |

\* cited by examiner

*Primary Examiner*—Melur Ramakrishnaiah
(74) *Attorney, Agent, or Firm*—Robert Platt Bell

(57) ABSTRACT

Alarm System Activation Platform (ASAP) is a customer relationship management system for activating and maintaining a large number of alarm monitoring accounts with a minimum of work per account. It differs from standard alarm customer relationship management systems in that it is designed from the ground up to be entirely automated. ASAP eliminates most or all of this partly through automation of account processing and partly through providing tools to the customer to allow "self-service" activation and maintenance. It allows large numbers of accounts to be quickly activated and maintained with only a very small amount of work required per account.

12 Claims, 4 Drawing Sheets

ALARM SYSTEM ACTIVATION PLATFORM

CROSS-REFERENCE TO RELATED APPLICATIONS

The present application is also a Continuation-In-Part (CIP) of co-pending U.S. patent application Ser. No. 10/462,708 filed on Jun. 17, 2003 and incorporated herein by reference. The present application is also a Continuation-In-Part (CIP) of co-pending U.S. patent application Ser. No. 10/840,280 filed on May 7, 2004, and incorporated herein by reference. The present application is also a Continuation-In-Part (CIP) of co-pending application Ser. No. 10/861,790, filed on Jun. 7, 2004, and incorporated herein by reference. The present application also claims priority from Provisional U.S. Patent Application Ser. No. 60/651,662 filed on Feb. 11, 2005 and incorporated herein by reference. The present application is also a Continuation-In-Part of U.S. patent application Ser. No. 11/226,857 filed on Sep. 14, 2005 and incorporated herein by reference.

FIELD OF THE INVENTION

The present invention relates towards alarm and security system monitoring. In particular, the present invention is directed toward an Alarm System Activation Platform (ASAP) which is a customer relationship management system for activating and maintaining a large number of alarm monitoring accounts with a minimum of work per account.

BACKGROUND OF THE INVENTION

Traditionally, bringing an alarm monitoring customer online requires many hours of work even if the system is already physically installed, as the system must be programmed, the customer educated in using the system, contact and billing information gathered, and all of this information entered into the central station database. Once the account is active, staff must remain on call to assist the customer in testing the system regularly, make changes to the system's programming, make changes to the contact information on file for the customer, bill the customer, and handle other situations that arise regularly.

All of this labor-intensive activity adds to the cost of alarm system activation, installation, monitoring, and maintenance. As a result, alarm system companies have to charge more for monthly monitoring, or charge for such activation services. As the alarm monitoring business may have narrow margins to begin with, and is rather competitive, it would be advantageous to reduce such costs be eliminating or minimizing such labor-intensive activities.

In the prior applications cited above, from which applicant claims priority, an alarm redirection system is disclosed whereby alarm signals from a user's alarm system may be sent to a middleware processor. This processor may then redirect the alarm signals, in a standardized format, to a monitoring center. The monitoring center then performs the standard monitoring functions, such as calling Police and Fire officials and the like when an alarm sounds. The use of the middleware processor allows the user to switch monitoring companies without having to change hardware. Moreover, the middleware processor provider can package monitoring services and sell them to an end user, selecting from various alarm monitoring providers for the best price and service.

SUMMARY OF THE INVENTION

The Alarm System Activation Platform (ASAP) of the present invention is a customer relationship management system for activating and maintaining a large number of alarm monitoring accounts with a minimum amount of work per account. It differs from standard alarm customer relationship management systems in that it is designed from the ground up to be entirely automated.

ASAP eliminates most or all of this manual labor, partly through automation of account processing and partly through providing tools to the customer to allow "self-service" activation and maintenance. It allows large numbers of accounts to be quickly activated and maintained with only a very small amount of work required per account.

Since alarm signals from the user are intercepted at the middleware processor, an opportunity exists to provide services to the end user directly from the middleware processor. Thus, various consumer interface services can be provided directly from the middleware processor, if desired, to eliminate manual labor for the alarm monitoring company in terms of account setup, testing, and the like. Moreover, additional services can be provided to the user, such as notification of alarm events, without having to involve the end monitoring company.

DETAILED DESCRIPTION OF THE INVENTION

The basis of Alarm System Activation Platform (ASAP) is the concept of rooms. Rooms are categories into which accounts are automatically placed. An account may only be in one room at a time, and may be automatically or manually moved from one room to another. In a room, different actions may be performed on an account, such as sending an e-mail to the account's e-mail address, or charging the account's credit card. Every room has one or more doors that lead to other rooms, allowing for multiple paths through them. Customers may log into their accounts via secure website, and will be shown different messages and options depending on the room their account occupies.

Figure 3:
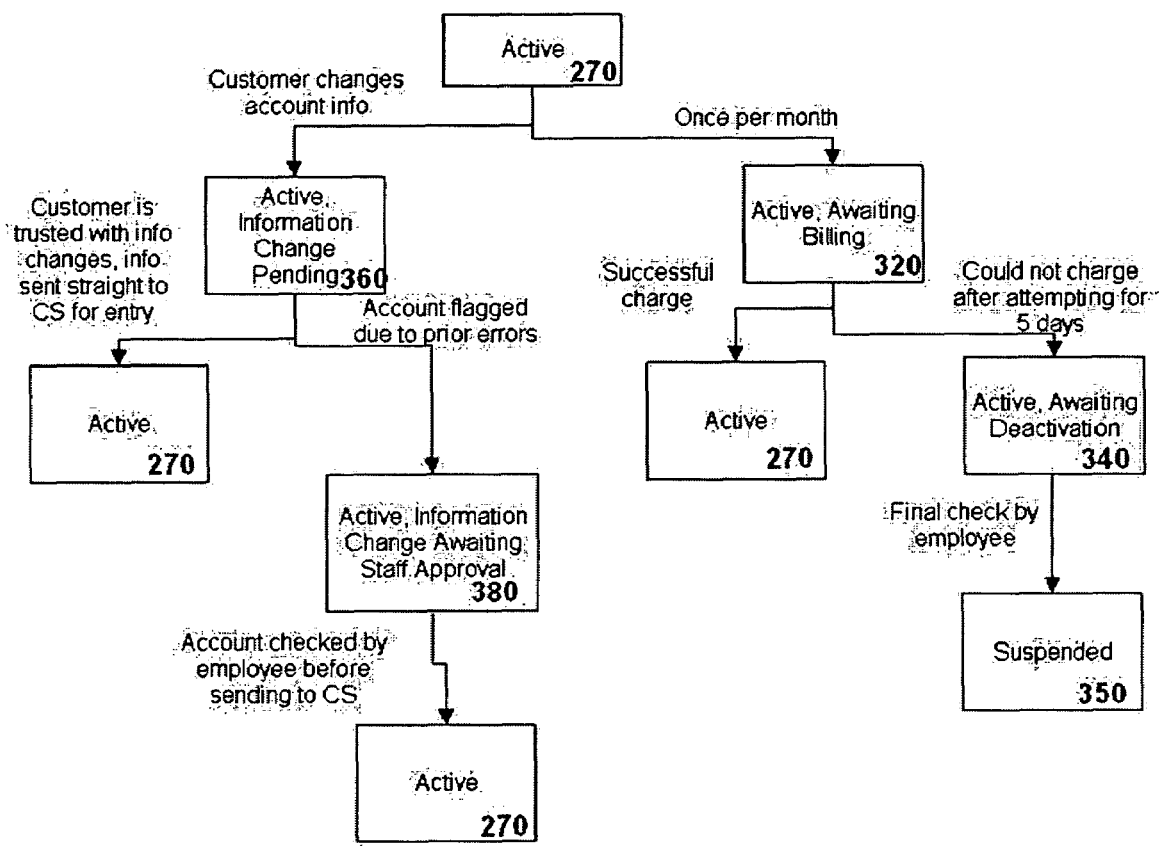
FIG. 3 is a block diagram of the ASAP account activation process.

FIG. 3 illustrates an example of how rooms may be used. In this example, account A is in the Active room 270. Alarm signals received from accounts in this room are received and responded to normally, and the customer may log into the account and access all features normally offered to him or her. On the 15th of each month, account A is moved to the Active, Awaiting Billing room 320. All accounts in this room have their credit cards charged at midnight. If the charge goes through on Account A, the account is moved back to Active room 270 until the 15th of the next month. If the charge does not go through, an e-mail is sent urging the customer to update his or her billing information, and the account stays in Active, Awaiting Billing 320.

Accounts that remain in Active, Awaiting Billing 320 for five days or more may be moved to Suspended 340. Alarm signals from accounts in this room may not be responded to, and logging into the account displays a message indicating that service has ended or is suspended, pending payment. All of these actions may be completely automatic, with no employee intervention necessary.

Optionally, an account in Active, Awaiting Billing 320 for more than five days may be first placed in Active, Awaiting Deactivation 340, where it will wait for an employee of the middleware provider to manually review the account. If the employee finds they cannot contact the customer, and a valid reason exists to suspend the account, the account may then be sent to suspended 350. A manual check of this nature may prevent an account from being prematurely suspended due to minor problems (e.g., credit card expired) and thus maintain customer goodwill.

The other half of the ASAP account management system is the Customer Control, allowing customers direct access to most aspects of their accounts. Direct access is accomplished through a variety of tools provided to the customer that allows him or her to manage the account without being literate in the technical aspects of alarm systems.

As part of the Customer Control feature, Customers may be able to access a real-time signal log. Customers may log into their accounts via secure website and view a log of all data their alarm system has sent out to the ASAP system. This data is automatically translated into plain English from the alarm codes sent. For example, the standard Contact ID code 182833R40100005 may be displayed as "System Armed by User Code 5". Furthermore, data is automatically matched to any notes the customer has provided via the website. For example, the customer may specify that User Code 5 is used by "house sitter". After doing this, 182833R40100005 would be displayed as "System Armed by house sitter". Thus, the user is provided with a user-friendly, plain English description of real-time alarm events. The user does not have to remember which user code was assign to which user, or what a particular zone alarm means, or the like. Note that while described here as "plain English" the system may be programmed to work in any other language or languages as well, either as selected by the user or the system administrator.

E-notify is a corollary to the real-time signal log. Customers may specify that certain signals from their alarm system trigger automatic e-mails to one or more e-mail addresses. The alert may be set to trigger on all signals, or on certain types of signals (such as alarms only, or arming and disarming only), or only on a specific signal (such as an alarm triggered by the sensor on the front door). A latchkey alert may also be created here, for example to send an e-mail if a store's alarm system is not armed at closing time. Signals may also be sent, for example, when certain users disarm or arm the system. Thus, for example, a parent may be able to monitor when a child arrives home by being notified when the child's user code disarms the alarm.

The Customer Control feature may also include a test mode. Customers may log into their accounts and place the account in test mode. This means all signals will be received and logged on the ASAP website, but will be blocked from the central station, and so will not be responded to. Test mode may be used for testing that the alarm system is sending signals without triggering a police response, and may also be used to temporarily take monitoring service offline so that maintenance may be performed on the alarm system, such as changing smoke alarm batteries or sensor batteries. In Prior Art alarm systems, the user usually needs to contact the central station by telephone, provide an verbal code, and ask that the system be placed in test mode for a predetermined period. Using humans to answer phones and put systems in test mode takes up expensive and valuable labor time. Note that the ASAP system here may be used as the primary connection between the user's alarm system and the monitoring center.

ASAP's test mode differs from standard test mode used by other companies in that the customer has direct control over when test mode begins and how long it lasts, and in that signals are actually blocked from being received at the central station. Normally, placing an account in test mode requires operator intervention, as the alarm signals are still received and seen by dispatchers, and a note must be placed in the account indicating to ignore them. Combined with the real-time signal log, ASAP's test mode allows customers to test and maintain their systems at any time 24/7, with no possibility of human error on the part of the alarm company.

Another feature of the Customer Center is automated remote programming. ASAP is designed to work with the automatic remote programmers, or downloaders, developed by NextAlarm, Incorporated, assignee of the present application. Although most existing alarm systems have PC software available to program them over a telephone line, they require a skilled technician to operate and are generally not available to the public. With automated remote programming, a customer may view their system's current programming via a secure website and choose to change any options, such as codes to type in, or sensor programming. ASAP sends these programming changes to the appropriate remote programmer for the customer's alarm system, and the remote programmer will automatically operate existing alarm programming software developed by alarm panel manufacturers to call the customer's panel and make the changes.

The Customer Control also allows access to account data, as illustrated in FIG. 3. Customers may log into a secure website to view and change all contact information and billing information on file in their account. When a customer changes the data in their account, several actions may be taken automatically. The data may be immediately entered into the dispatch center database. Alternatively, the account may be set to move to an Active, Information Changes Awaiting Approval room 360, which is periodically checked by employees. Accounts in this room are reviewed, the changes entered into the dispatch center database, and then allowed to proceed back to Active room 270. This allows the alarm company to protect against incorrect information being entered in the account. While in Active, Information Changes Awaiting Approval room 380, logging into the account will display a message explaining that the recent changes are being reviewed. Further changes to the account are blocked while it is in this room. Alternately, the system may be programmed to allow customers, or certain groups of customers to change their customer information directly, in which case, the account would be placed from Active, Information Change Pending room 360 directly back to Active room 270.

Customer control may also include an expert mode. The concept of rooms and automatically moving accounts through them, combined with the tools provided to customers for account management, allows for an expert mode. Expert mode is an account creation process unique in the alarm industry, allowing customers to go from initial sign-up to account activation with no employee action required.

Figure 1:
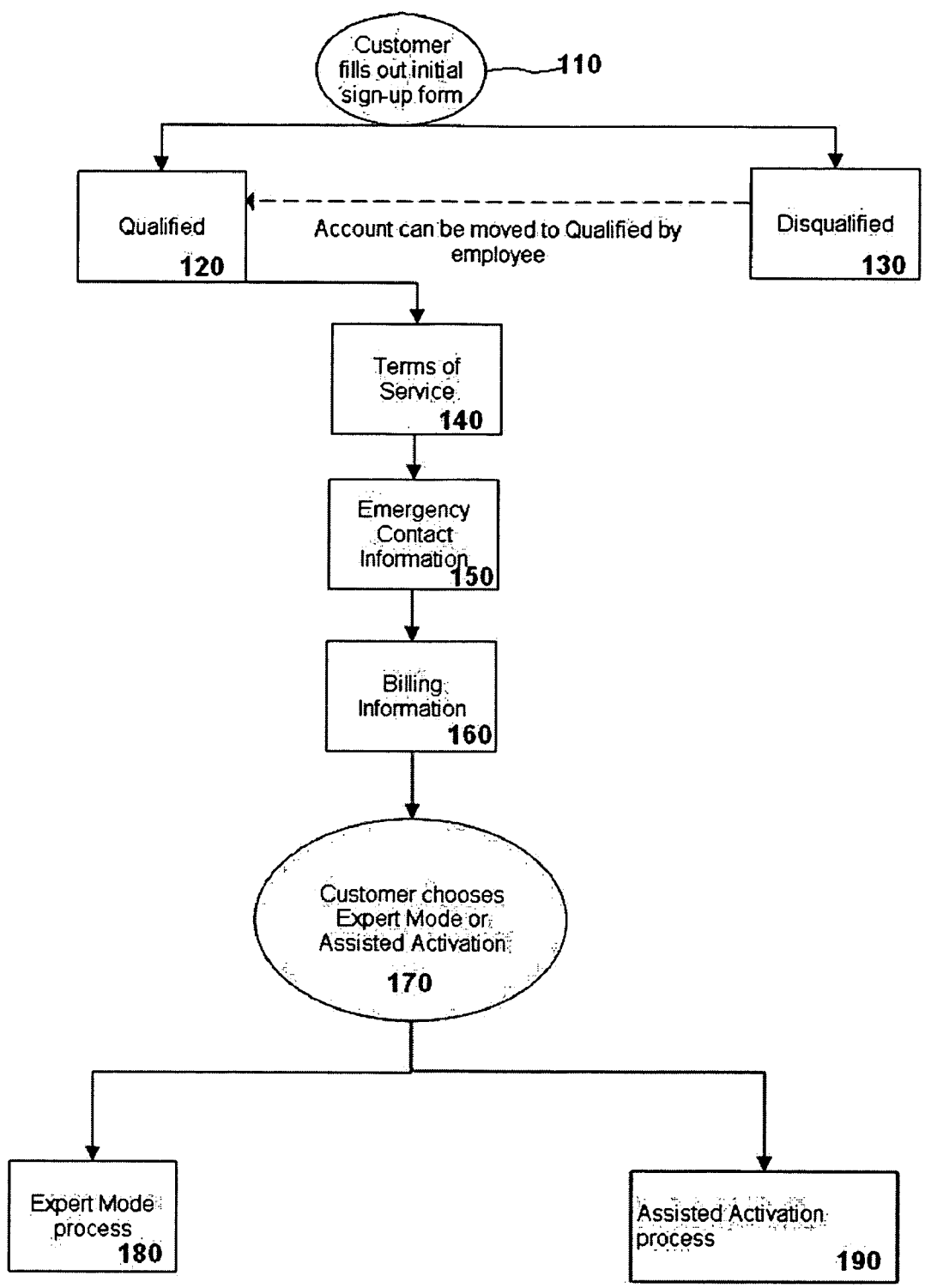
FIG. 1 is a block diagram of the ASAP initial sign-up process.

FIG. 1 is a block diagram of the initial signup process for a customer. In step 110, a customer may access the NextAlarm (or other) website via home computer, kiosk, PDA, or the like to access an initial sign-up form. Note that as used herein, the term "form" means an electronic form in the preferred embodiment.

From the information provided in the sign-up form, a customer account may be placed in one of two rooms, qualified room 120 or disqualified room 130. Whether or not a customer is qualified may depend upon credit score, whether the region the customer is operating in is served by the company, compatibility of equipment, errors in input data, declined credit card, or other indicia. A customer account can be moved from disqualified room 130 to qualified room 120 by a customer service representative or employee, if the customer feels the disqualification by the automatic system is not justified or can be corrected. For example, if a customer is disqualified, they may be prompted to call the customer service center, where the customer care representative may qualify them if information provided needs correction, or as in the case of a low credit score, if a deposit or credit card information is provided.

Once qualified, the customer is presented with terms of service (TOS) in step 140, which the customer must accept in order to proceed. The customer then provides emergency contact information in step 150 and billing information in step 160. In step 170, the customer selects from expert mode process 180 or assisted activation process 190.

Figure 4:
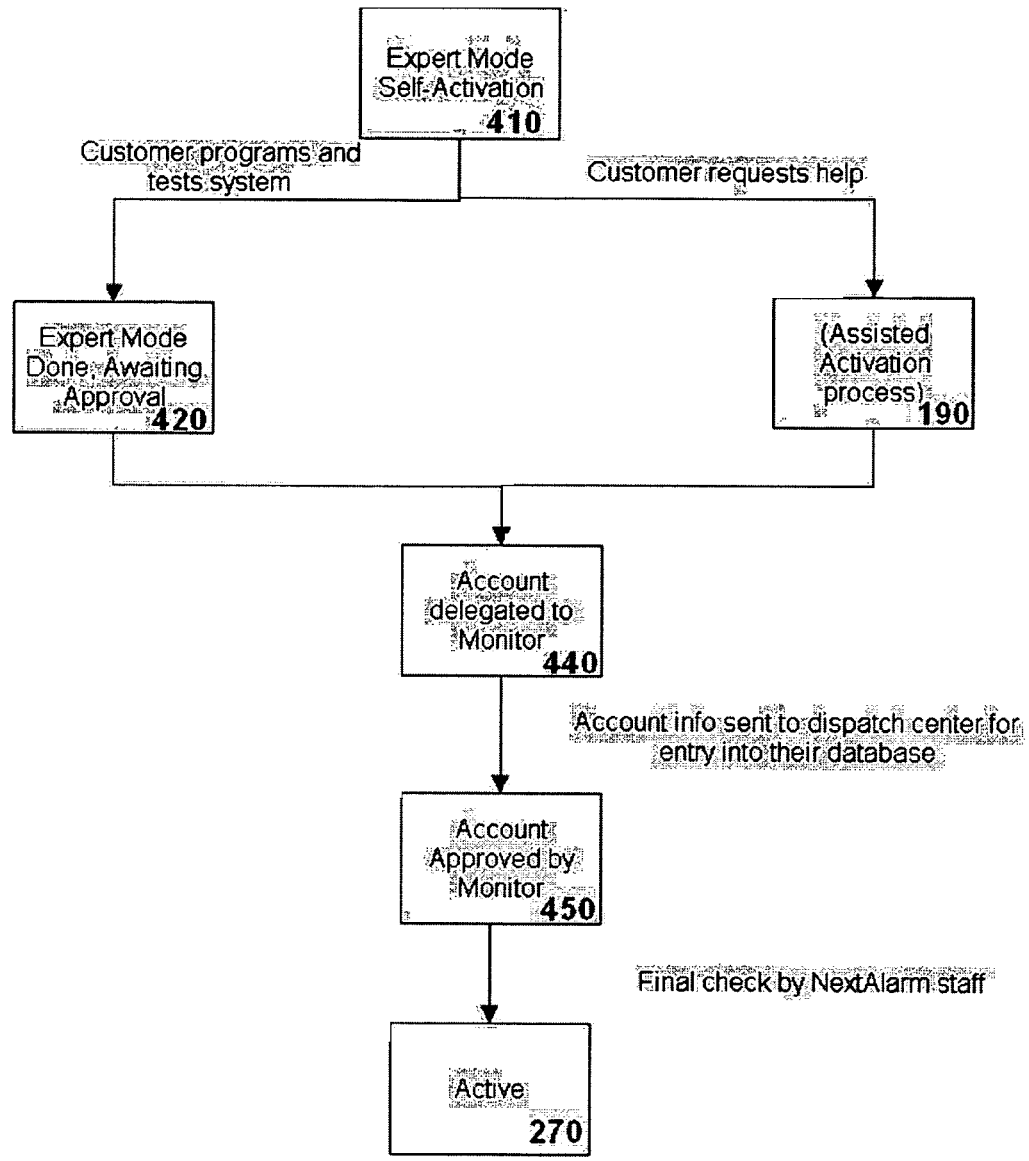
FIG. 4 is a block diagram of the expert mode for self-activation.

Customers who choose expert mode 180 during sign-up are placed in Expert mode room 180. Expert mode self-activation is illustrated in FIG. 4. In step 410, logging into the account while in this room will display programming information specific to their system, such as the account number automatically assigned to the system, the phone number the system should dial to send signals to the dispatch center, and the report codes that the system should send. The customer may program the system at his or her convenience, and log into the account at any time to see the signals their system has sent so far. When the customer is satisfied with the system's programming, an Activate My Account option is available to automatically move the account forward. Depending on how ASAP is configured, the account may move to Expert Mode Complete, Awaiting Approval room 420 which allows employees to review the account in step 440 and approve it in step 450 before it is placed in Active room 270, or the account may immediately be entered into the dispatch center database, moving the account directly to the Active room 270. If the customer has trouble configuring their system in expert mode, they may request help, which sends them to assisted activation process 190.

Figure 2:
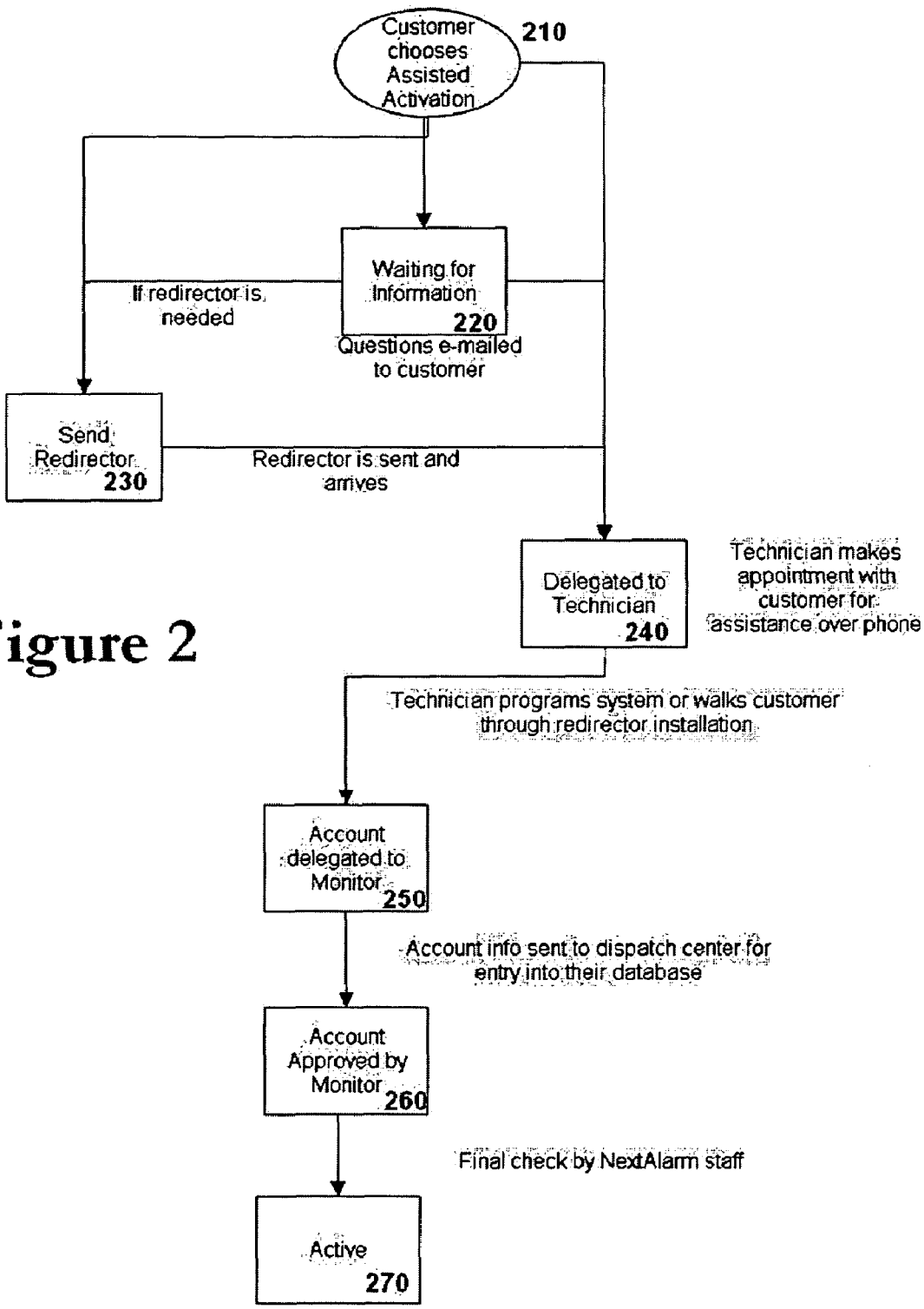
FIG. 2 is a block diagram of the ASAP assisted activation process.

The process in activation process room 190 may be represented by the steps set forth in FIG. 2. Referring to FIG. 2, in step 210, the customer has selected the assisted activation process. Processing then passes to room or step 220 where questions are e-mailed to the customer and a reply is awaited. Questions may include requests for information regarding alarm system type and model, number of zones, and the like, name of the current alarm service provider, original alarm installer. If the alarm can be readily reprogrammed remotely using electronic means, the system may be then reprogrammed to dial the middleware provider and the process may stop there.

However, some alarm systems use a proprietary programming technology. As noted in the parent applications to the present application, the term "proprietary" may mean only that the motherboard of the alarm system is set up so that it cannot be reprogrammed readily to dial out to another alarm service provider. Many alarm service providers use such "proprietary" panels in an attempt to prevent users from switching alarm service providers. If a proprietary alarm panel is detected by the responses to the information in step/room 220 (e.g., either from model number or mother board serial number or from the name of the company installing the alarm) then a redirector may be sent out (e.g., via mail or shipping service) to the alarm customer in step 230.

The redirector may take any one of a number of forms, including those described in the parent applications to the present application. The redirector may receive signals from a customer's alarm system, and redirect these signals to the middleware provider, either by dialing to a different number, sending a signal over the internet, or by other means. Alarm signals indicating what type of alarm is tripped, arming or disarming signals, and the like may be translated or sent in their original form.

Once the redirector arrives at the customer's location, a technician appointment may be made to install the redirector. Since installing a redirector can be a plug-in operation, the user can receive installation instructions over the phone, by real-time chat via the internet, or by a personal visit. Once the system has been programmed and the redirector installed, the account may be delegated to monitor in step 250 and account information sent to the dispatch center for entry into their database. The dispatch center may comprise the alarm monitoring center which actually receives alarm signals from the middleware provider and acts upon alarm signals (e.g., calling Fire or Police). Once the account is approved by the monitor in step 260, a final check is by the middleware provider (e.g., NextAlarm, Incorporated, assignee of the present application) and the account is placed in the Active room 270.

As illustrated in the foregoing description and attached Figures, the ASAP system of the present invention allows an alarm middleware provider or alarm monitoring provider to competitively provide alarm monitoring services by reducing he amount of manual labor needed to set up and maintain alarm service customers. As part of a middleware solution, ASAP allows a middleware provider to amalgamate a large number of alarm customers with various alarm system types into a unified database of alarm monitoring customers which may then be communicated directly to an alarm monitoring company without the need for manually keying customer data.

Moreover, the middleware solution allows customers to alter their customer data as well as monitor or test their alarm systems without having to involve personnel from the end alarm monitoring company. As a result, the alarm monitoring company can provide a bulk discount to the middleware provider, and those savings can be passed on to the end consumer. If the end monitoring company raises rates, the middleware provider can switch to a new monitoring company using the bulk database of customer data to switch to a new monitoring provider in a seamless and transparent manner.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method for interfacing with an alarm monitoring customer to accumulate alarm monitoring data, comprising the steps of:

receiving, though a customer interface, customer information data;

comparing customer information data with predetermined customer values and determining whether a customer is qualified or disqualified for alarm monitoring service; and if qualified, generating an activation process, prompting for customer alarm information data,
wherein the activation process further comprises the steps of:
comparing the alarm information data to predetermined alarm values and determining if a customer alarm system can be automatically programmed,
programming the customer alarm system if it is determined that the customer alarm system can he automatically programmed, and
compiling the customer information data and the alarm information data into account data, and forwarding compiled account data to an alarm monitoring service provider to monitor the customer alarm system.

2. A method for interfacing with an alarm monitoring customer to accumulate alarm monitoring data, comprising the steps of:
receiving, though a customer interface, customer information data;
comparing customer information data with predetermined customer values and determining whether a customer is qualified or disqualified for alarm monitoring service; and
if qualified, generating an activation process, prompting for customer alarm information data,
wherein the activation process further comprises the steps of:
comparing the alarm information data to predetermined alarm values and determining if a customer alarm system can be automatically programmed,
programming the customer alarm system if it is determined the customer alarm system can be automatically programmed,
forwarding an alarm redirector to the customer if it is determined that the customer alarm system cannot be automatically programmed, and
compiling the customer information data and the alarm information data into account data, and forwarding compiled account data to an alarm monitoring service provider to monitor the customer alarm system.

3. The method of claim 2, further comprising the steps of:
receiving, through the customer interface from the customer, data to update customer information,
placing the customer information in a customer file for review, and
forwarding updated reviewed customer information to the alarm monitoring service provider.

4. The method of claim 2, further comprising the steps of:
placing account data into an active state after account data has been forwarded to the alarm monitoring service provider,
placing account data into an active awaiting billing state after a first periodic period of time,
returning an account to the active state after a second period of time if a balance on the account has been paid, and
placing account data into a suspended mode after the second period of time if the balance on the account has not been paid.

5. The system of claim 2, further comprising the steps of:
receiving, through a customer interface, a customer request to put the customer alarm system in test mode, and
intercepting, at a middleware provider, alarm signals from the customer alarm system in response to a customer request to put the customer alarm system in test mode.

6. The system of claim 2, further comprising the steps of:
receiving, through a customer interface, a customer request for alarm system data,
receiving, at a middleware provider, alarm signals from the customer alarm system, and
forwarding to a customer, data indicating selected alarm signals received by the middleware provider.

7. A system for interfacing with an alarm monitoring customer to accumulate alarm monitoring data, comprising:
a customer interface for receiving customer information data; and
activation means for comparing customer information data with predetermined customer values and determining whether a customer is qualified or disqualified for alarm monitoring service and if qualified, generating an activation process, prompting for customer alarm information data,
wherein the activation means further comprises:
means for comparing the alarm information data to predetermined alarm values and determining if a customer alarm system can he automatically programmed,
means for programming the customer alarm system if it is determined that the customer alarm system can he automatically programmed, and
means for compiling the customer information data and the alarm information data into account data, and forwarding compiled account data to an alarm monitoring service provider to monitor the customer alarm system.

8. A system A system for interfacing with an alarm monitoring customer to accumulate alarm monitoring data, comprising:
a customer interface for receiving customer information data; and
activation means for comparing customer information data with predetermined customer values and determining whether a customer is qualified or disqualified for alarm monitoring service and if qualified, generating an activation process, prompting for customer alarm information data,
wherein the activation means further comprises:
means for comparing the alarm information data to predetermined alarm values and determining if a customer alarm system can be automatically programmed,
means for programming the customer alarm system if it is determined the customer alarm system can be automatically programmed,
means for forwarding an alarm redirector to the customer if it is determined that the customer alarm system cannot be automatically programmed, and
means for compiling the customer information data and the alarm information data into account data, and forwarding compiled account data to an alarm monitoring service provider to monitor the customer alarm system.

9. The system of claim 8, further comprising:
means for receiving, through the customer interface from the customer, data to update customer information,
means for placing the customer information in a customer file for review, and
means for forwarding updated reviewed customer information to the alarm monitoring service provider.

10. The system of claim 8, further comprising:
means for placing account data into an active state after account data has been forwarded to the alarm monitoring service provider,
means for placing account data into an active awaiting billing state after a first periodic period of time, means for returning an account to the active state after a second period of time if a balance on the account has been paid, and means for placing account data into a suspended mode after the second period of time if the balance on the account has not been paid.

11. The system of claim 8, further comprising:

means for receiving, through a customer interface, a customer request to put the customer alarm system in test mode, and means for intercepting, at a middleware provider, alarm signals from the customer alarm system in response to a customer request to put the customer alarm system in test mode.

12. The system of claim 8, further comprising:

means for receiving, through a customer interface, a customer request for alarm system data, means for receiving, at a middleware provider, alarm signals from the customer alarm system, and means for forwarding to a customer, data indicating selected alarm signals received by the middleware provider.

* * * * *